United States Patent [19]
Watanabe et al.

[11] Patent Number: 4,525,752
[45] Date of Patent: Jun. 25, 1985

[54] APPARATUS FOR RECORDING AND REPRODUCING A DIGITAL SIGNAL

[75] Inventors: Nobuhiko Watanabe; Masato Tanaka, both of Tokyo, Japan

[73] Assignee: Sony Corporation, Tokyo, Japan

[21] Appl. No.: 465,461

[22] Filed: Feb. 10, 1983

[30] Foreign Application Priority Data

Feb. 15, 1982 [JP] Japan .................... 57-22288

[51] Int. Cl.³ .................... G11B 27/02; G11B 5/00
[52] U.S. Cl. .................... 360/13; 360/32
[58] Field of Search .................... 360/13, 15, 32, 27

[56] References Cited

U.S. PATENT DOCUMENTS 4,403,261  9/1983  Tanaka .................... 360/13
4,445,149  4/1984  Bluethgen .................... 360/13

Primary Examiner—Vincent P. Canney
Attorney, Agent, or Firm—Lewis H. Eslinger; Alvin Sinderbrand

[57] ABSTRACT

An apparatus for reproducing a digital signal recorded on a recording medium in the form of successive data blocks, in which each data block includes at least plural data words and a block address circulating with a predetermined phase relation to a certain reference signal. In accordance with the reference signal, a control signal is recorded on the recording medium. The control signal is reproduced from the recording medium and a reference phase signal with a frequency of an integral multiple of more than twice the frequency of the control signal is sampled by the control signal, and a phase comparison output and a lock mode signal are generated from the sampling output. The running phase of the recording medium is controlled by the phase comparison output whereby the fluctuation of running speed of the recording medium due to discontinuities of the control signal can be suppressed. Further, by the lock mode signal, it becomes easy to change the phase of a block address which will be added to a newly recordable digital signal.

15 Claims, 16 Drawing Figures

FIG. 1
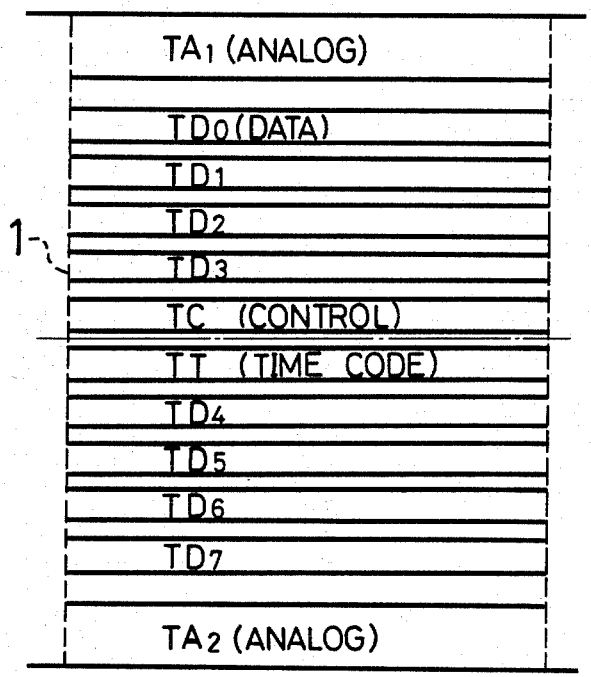
FIG. 2A
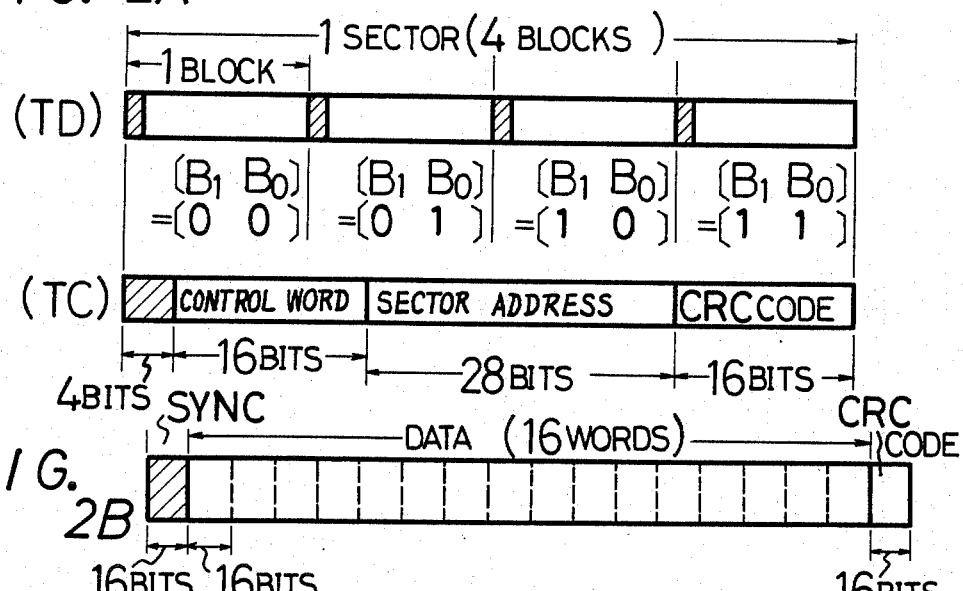
FIG. 2B

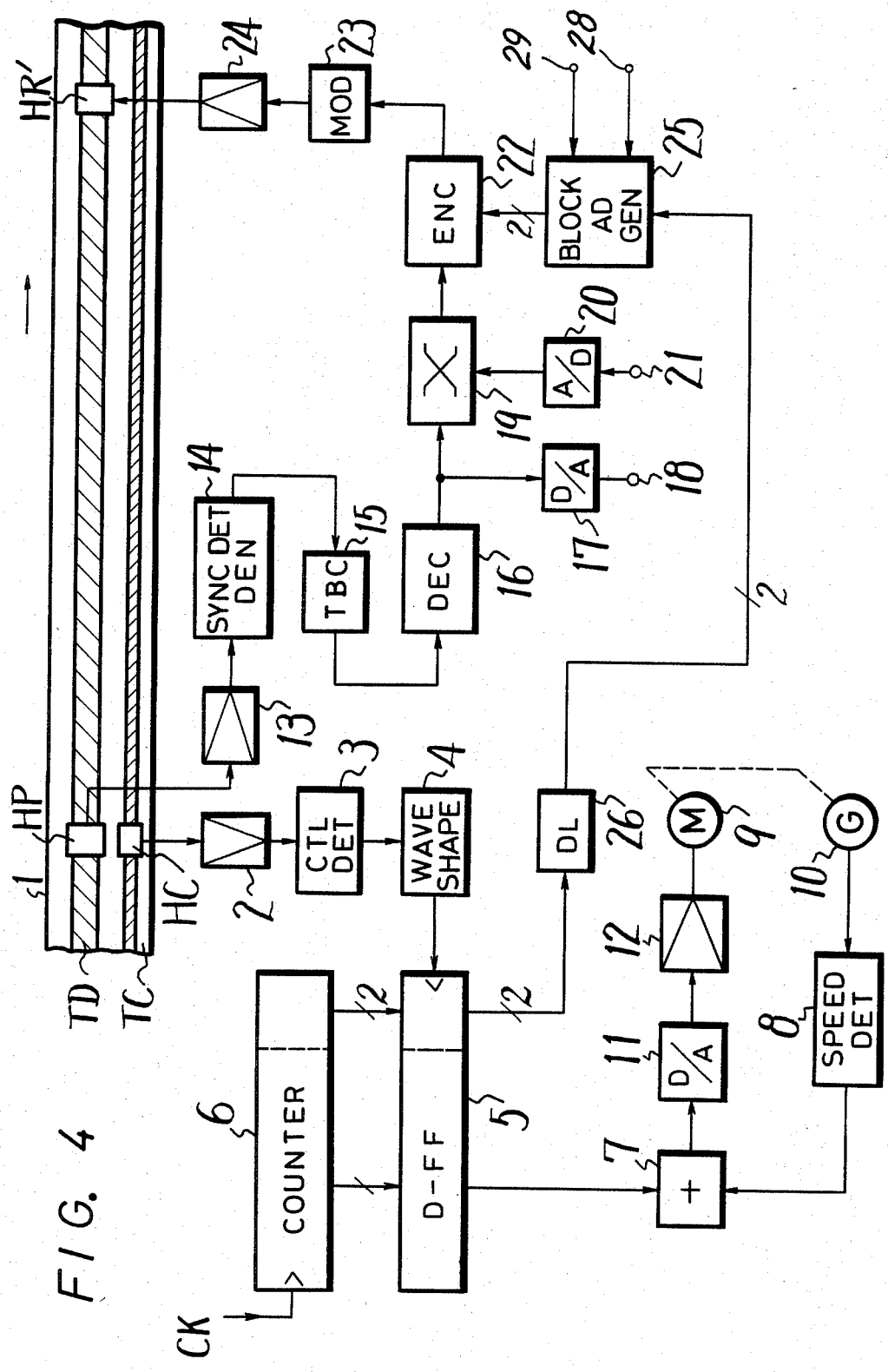

FIG. 7A
FIG. 7B
(TC)
FIG. 7C
(BA) 
FIG. 7D
FIG. 8A
{ TC₀, TC₁, TC₂, TC₃ }
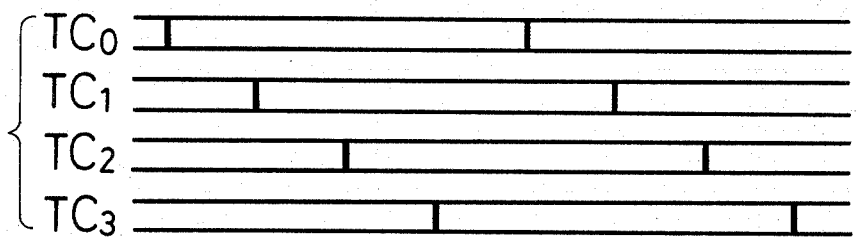
FIG. 8B
{ BA₀, BA₁, BA₂, BA₃ }
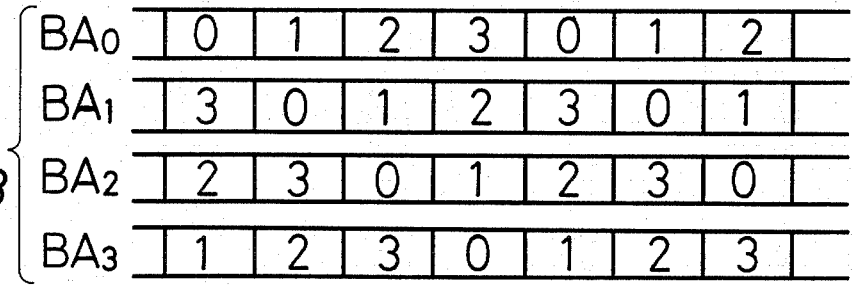

APPARATUS FOR RECORDING AND REPRODUCING A DIGITAL SIGNAL

BACKGROUND OF THE INVENTION

1. Field of the Invention

This invention relates generally to an apparatus for recording and reproducing a digital signal and particularly to an apparatus for recording and reproducing a digital signal made in the form of successive data blocks, and a block address circulating with a predetermined phase relation to a certain reference signal.

2. Description of the Prior Art

In the case of pulse code modulation (PCM) system tape recorder of fixed head type, it is known that, when a magnetic tape is transported at a predetermined speed, a servo pulse is recorded on the magnetic tape so as to have a predetermined frequency, and on playback, a phase-locked loop (PLL) servo circuit is employed to phase-compare the reproduced servo pulse with a reference phase signal to produce a compared output by which the running speed of the magnetic tape is controlled. But, when the phase of the servo pulse is varied considerably before and after an edit operation involving splice-edition and simple electronic edition, the phase compared output becomes a large one and the running speed of the magnetic tape is overly varied thereby so that sometimes the time base of the reproduced data varies considerably. Because of this the clock can not be extracted from the reproduced data and a time base error or variation beyond the correction range of a time base corrector (TBC) will take place. As an example of the TBC, the same assignee of this application, has previously proposed the U.S. application Ser. No. 06/298,522 which was filed on Sept. 1, 1981.

Furthermore, in the PCM-system tape recorder, a sync recording is carried out to record a digital signal so as not to lose continuity for the previously recorded digital signal. In this case, a preceding playback head or transducer is used to record a new signal so as to produce a relationship relative to the block address and the like, that is the same as the predetermined recording format. Therefore, the generation phase of the block address must be changed before and after the phase jump of the servo pulse occurs.

OBJECTS AND SUMMARY OF THE INVENTION

Accordingly, an object of this invention is to provide an improved apparatus for recording and reproducing a digital signal.

Another object of this invention is to provide an apparatus for recording and reproducing a digital signal capable of suppressing a running speed variation of a magnetic tape which will be caused when the phase of a servo pulse becomes discontinuous.

Further object of this invention is to provide an apparatus for recording and reproducing a digital signal with a polyphase servo circuit for sampling by a reproduced servo pulse a reference phase signal with a frequency of an integral multiple of more than 2, for example, four times the frequency of the servo pulse when the magnetic tape is moved at a predetermined speed.

Yet a further object of this invention is to provide an apparatus for recording and reproducing a digital signal in which a lock mode signal derived from the polyphase servo circuit is used to change the generation phase of the block address to be recorded again.

According to an aspect of the present invention, there is provided an apparatus for recording and reproducing a digital signal, said digital signal being formed of successive data blocks, each data block including at least plural data words and a block address circulating with a predetermined phase relation to a certain reference signal and then recorded on a recording medium on which is recorded a control signal in accordance with said reference signal, said apparatus being characterized by:

means for reproducing said data words and block addresses within said data blocks from said recording medium;

time base correcting means for correcting a time base error contained in a reproduced data word;

means for reproducing the control signal from said recording medium;

means for generating a reference phase signal with a frequency of an integral multiple of more than twice the frequency of said control signal;

sampling means for sampling said generated reference phase signal by said reproduced control signal so as to generate a phase compared output signal and a lock mode signal; and servo means for controlling running of said recording medium by said phase compared output signal.

The other objects, features and advantages of the present invention will become apparent from the following description taken in conjunction with the accompanying drawings through which the like references designate the same elements and parts.

BRIEF DESCRIPTION OF THE DRAWINGS

FIG. 1 and FIGS. 2A–2B are schematic diagrams each representing one example of track patterns to which the present invention is applied;

FIG. 4 is a schematic block diagram showing an overall arrangement of an example of the apparatus according to this invention;

FIGS. 7A–7D and FIGS. 8A and 8B are timing diagrams each used to explain the operation of one embodiment of this invention shown in FIG. 4.

DETAILED DESCRIPTION OF THE PREFERRED EMBODIMENT

With reference to the drawings, one embodiment of this invention being applied to a fixed head or transducer type PCM tape recorder will be described. As shown in FIG. 1, in this case, on a magnetic tape 1 of ¼-inch width are formed 8 data tracks $TD_0$ to $TD_7$, 2 analog tracks $TA_1$ and $TA_2$, a control track TC and a time code track TT, respectively. On 8 data tracks $TD_0$ to $TD_7$ are recorded respective audio PCM signals comprising 8 channels, each being encoded as is determined before. As illustrated in FIG. 2A, the data tracks TD ($TD_0$ to $TD_7$) and the control track TC are coincident with each other at their recording positions for each sector in the width direction. One sector of each of the data tracks TD includes data of 4 blocks. As shown in FIG. 2B, one transmission block (simply, referred to as one block) is formed of data of 16 words, with each word being formed of 16 bits, a data synchronizing signal (shown by the hatched area in FIG. 2B) added to the beginning of the data and a cyclic redundancy check (CRC) code added to its end. A block address signal of 3 bits is inserted into the interval of the data synchronizing signal, and the block address signal and the data will both be detected for error by the CRC code. One sector of the control track TC is comprised of a synchronizing signal of 4 bits (shown by the hatched interval in FIG. 2A), a control word of 16 bits, a sector address signal of 28 bits and a CRC code of 16 bits. The control word of 16 bits is used to identify the sampling frequency of the PCM audio signal to be recorded and the recording format and the sector address is the absolute address incrementing from 0 address, both of which will be detected for error by the CRC code. As a modulation method for recording the audio PCM signal on the data tracks TD, there is employed a modulation system of high density recording, while an FM-modulation system or the like is employed to record a control signal on the control track TC. The block address $[B_1 B_0]$ in one sector sequentially changes so as to appear, specifically, [00], [01], [10] and [11] in that sector.

Figure 3:
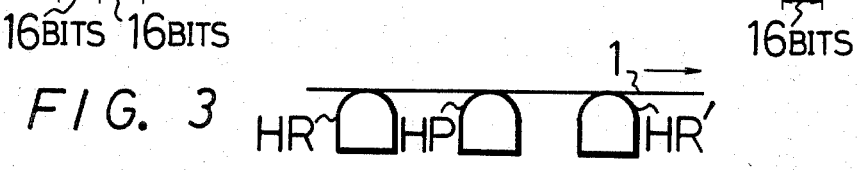
FIG. 3 is a schematic diagram representing one example of the arrangement of recording and playback transducers or heads to which the present invention is applied.

As shown in FIG. 3, there are provided magnetic heads or transducers as a recording transducer HR, a playback transducer HP and a recording transducer HR' which are sequentially located in this order relative to the direction in which the magnetic tape 1 is transported. Each transducer has 10 recording or reproducing magnetic gaps each arranged in line along the width direction of the magnetic tape 1 of which 8 magnetic gaps correspond to the data tracks $TD_0$ to $TD_7$ and the remaining two magnetic gaps correspond to the control track TC and the time code track TT, respectively. The first recording on the magnetic tape 1 is carried out by the recording transducer HR, and in the case of sync-recording, cut-in/-out and so on, the recording transducer HR' is employed. The control track TC once formed by the recording transducer HR is not rewritten but only the data tracks TD are rewritten.

FIG. 4 schematically illustrates an example of the apparatus for recording and reproducing a digital signal according to the present invention in which a PCM signal is reproduced by the playback transducer HP from the data tracks TD and the control track TC is reproduced by a control transducer HC.

The output from the control transducer HC is supplied through a playback amplifier 2 to a CTL detection circuit 3 in which a CTL (control) signal is detected by detecting a synchronizing signal at every one sector. This CTL signal is supplied to a waveform shape circuit 4 which then produces at its output a servo pulse. This servo pulse is supplied to a D-type flip-flop circuit 5 for phase comparison as its clock input.

Figures 5A, 5B, 5C, 5D:
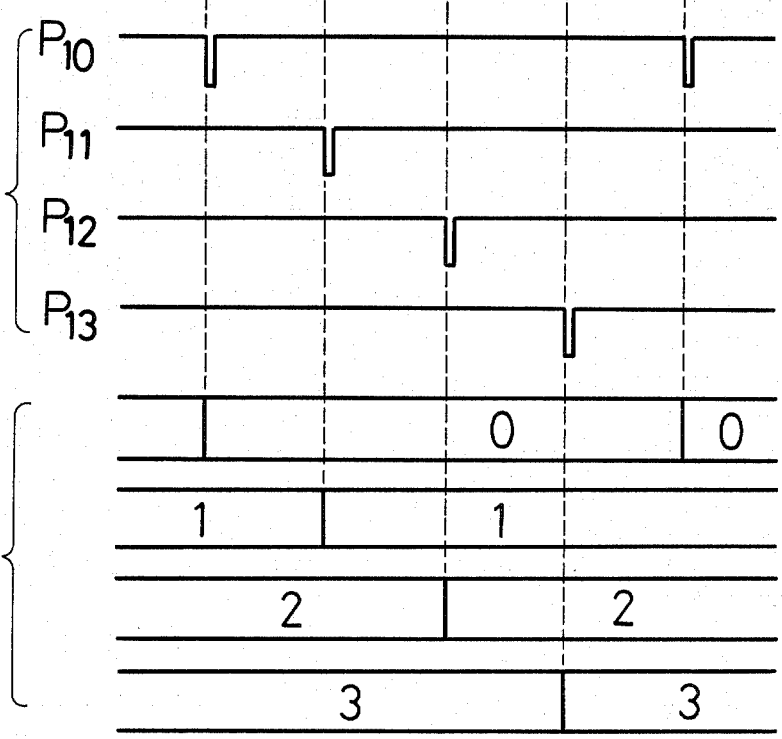
FIGS. 5A–5D are timing diagrams each used to explain the operation of a polyphase servo circuit used in the present invention.

Reference numeral 6 denotes a counter for counting a clock pulse CK of which plural bits except upper 2 bits are parallel-supplied to the D-type flip-flop circuit 5 as a reference signal. As illustrated in FIG. 5A, the upper 2 bits of the counter 6 repeatedly changes with the cycle corresponding to one sector so as to appear as 0, 1, 2 and 3, while as shown by a sawtooth wave in FIG. 5B, the lower bits thereof change their values stepwise at every clock pulses CK. The reference signal of which the value changes stepwise is formed on the basis of 2's complementary code and the value thereof is changed symmetrically around 0, which is repeated four times per one sector.

The D-type flip-flop circuit 5 is adapted to sample any one phase of the four-phase reference signal by the servo pulse, which then produces at its output a phase comparison output and a lock mode signal. The phase comparison output is supplied to an addition circuit or adder 7 and therein added with an output from a speed detection circuit 8. The detection of speed is carried out such that a signal with a frequency proportional to a revolution rate of a capstan motor 9 is generated by a tachogenerator 10 and the frequency of this signal is converted to a corresponding voltage level in the speed detection circuit 8. The output from the adder 7 is converted by a digital-to-analog (D/A) converter 11 into an analog signal which is then supplied through a servo amplifier 12 to the capstan motor 9 made of a DC motor.

According to such servo circuit made so far, the magnetic tape 1 is transported at the predetermined speed with its phase locked to the reference signal. This phase-locking is performed for any one phase of 4-phase reference signal. In FIG. 5C, $P_{10}$, $P_{11}$, $P_{12}$ and $P_{13}$ respectively denote servo pulses in the state of being phaselocked to the respective reference phases of 0-th mode, first mode, second mode and third mode, respectively. Since in the D-type flip-flop circuit 5, the upper 2 bits of the counter 6 are sampled, the D-type flip-flop circuit 5 generates lock mode signals as shown in FIG. 5D in response to the servo pulse each with its phase locked to the 0-th mode to the third mode-respectively.

The reproduced data (which is considered as data of one channel for simplicity) from the playback transducer HP is supplied through a playback amplifier 13 to a sync detection and demodulation circuit 14 from which a reproduced data and a block synchronizing signal are supplied to a time base corrector (TBC) 15. The output from the TBC 15 is supplied to a playback decoder 16 which then performs a processing such as error correction, error concealment and so on to produce a reproduced audio PCM signal. This reproduced audio PCM signal is supplied through a digital-to-analog (D/A) converter 17 to an output terminal 18 and supplied to a cross-fader 19 as its one input.

The cross-fader 19 is supplied with a recording audio PCM signal from an analog-to-digital (A/D) converter 20 as its other input. The A/D converter 20 has an input terminal 21 to which an audio signal is applied from a mixer (not shown) or the like. The cross-fader 19 is operated to selectively produce either of the two inputs and to decrease gradually the level of the previous data (fade-out) while to increase gradually the level of new data (fade-in). The output from the cross-fader 19 is supplied to a recording encoder 22 in which it is converted into the afore-said recording data and then supplied through a modulation circuit 23 and a recording amplifier 24 to the recording transducer HR' thereby recorded on the data tracks TD. The recording encoder 22 is adapted to process the recording audio PCM signal for error correction encoding and to add thereto a block address signal.

In FIG. 4, reference numeral 25 denotes a block address generator associated with the recording encoder 22. This block address generator 25 is supplied with the lock mode signal from the above D-type flip-flop circuit 5 through a delay circuit 26 and a sector sync signal at input terminal 29 and a block clock signal at input terminal 28. This delay circuit 26 has a delay time necessary for supplying the lock mode signal representing the previous phase relation to the block address generator 25 until a splice-edition point is detected by the playback transducer head HP and then passed through the recording transducer head HR'. In other words, this is because the capstan servo circuit employs the CTL signal played back by the CTL transducer HC placed at the same position as that of the preceding playback transducer HP.

Figure 6:
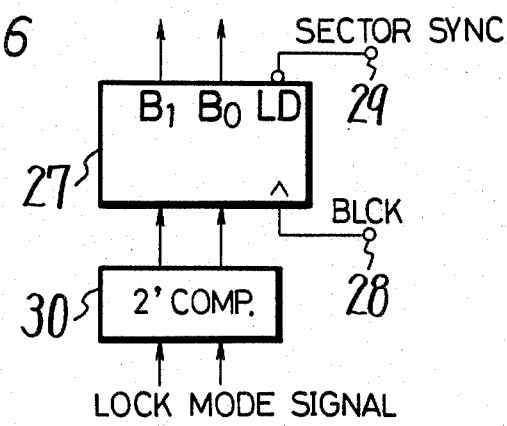
FIG. 6 is a schematic block diagram showing a block address generator used in the apparatus of this invention shown in FIG. 4.

FIG. 6 illustrates a practical arrangement of the block address generator 25 in which numeral 27 denotes a 2-bit counter which counts a block clock BLCK from a terminal 28 and which then produces a block address BA of 2 bits, $B_0$ and $B_1$ changing sequentially at every block. This counter 28 is supplied at its load terminal LD with a sector synchronizing pulse SYNC from a terminal 29. The sector synchronizing pulse SYNC is formed from a system reference signal, having a period of one sector similar to the servo reference phase signal. By this sector synchronizing signal SYNC, a lock mode signal supplied through a logic circuit 30 is preset in the counter 27. The purpose of this logic circuit 30 is to convert the lock mode signal of 2 bits into 2's complementary code as follows:

00→00, 01 (1)→11 (3)

10 (2)→10 (2), 11 (3)→01 (1)

One embodiment of this invention will further be described in conjunction therewith, the generation of the block address.

FIG. 7A illustrates the sector synchronizing signal SYNC with a sector period. The purpose of the polyphase servo circuit is to synchronize the phase of the synchronizing signal from the control track TC with any one phase of the four-phase reference phase signal. If the lock mode is in the 0-th mode, for the sector synchronizing pulse shown in FIG. 7A the control track TC becomes as shown in FIG. 7B. Each of the vertical solid lines in FIG. 7B represents the phase of the synchronizing signal from the control track TC. Accordingly, from the synchronizing signal of the control track TC, the block address BA changes so as to appear as 0→1→2→3 as shown in FIG. 7C. That is, as shown in FIG. 7D, the lock mode signal is at "0" and the output from the logic circuit 30 is also at "0", which are then preset by the sector synchronizing pulse SYNC in the counter 27. Thereafter, they are incremented by the block clock BLCK and again preset by the sector synchronizing pulse SYNC.

If now, due to the splice-edition point or cue, the phase of the synchronizing signal from the control track TC is jumped, or as, for example, shown in FIG. 7B, the period thereof becomes 1.5 times the previous period, as will be clear from the afore-noted description of the polyphase servo circuit, the lock mode is changed to the second mode and as shown in FIG. 7D, the lock mode signal changes to 2. Then, the 2's complementary code becomes 2 and is preset by the sector synchronizing pulse SYNC in the counter 27. Accordingly, as shown in FIG. 7C, after the sector synchronizing pulse SYNC occurs following the splice-edition point, the block address BA becomes the same as the recording format for the control track TC.

FIG. 8A illustrates respectively the phases of control tracks $TC_0$, $TC_1$, $TC_2$ and $TC_3$ in the lock modes of 0-th mode, first mode, second mode and third mode. The phase of the synchronizing signal from the control track $TC_0$ in the 0-th mode is coincident with that of the sector synchronizing pulse SYNC as mentioned before. Then, the block address generator 25 shown in FIG. 6 generates block addresses $BA_0$, $BA_1$, $BA_2$ and $BA_3$ shown in FIG. 8B, each corresponding to each lock mode. Since these block addresses $BA_0$, $BA_1$, $BA_2$ and $BA_3$ are added to the recorded data, the data recorded by the recording transducer head HR' is made coincident with the recording format mentioned in the beginning of this description so that when reproducing, the TBC employing the block address to process the reproduced data and so on are operated correctly.

As will be understood from the above embodiment of this invention, since the servo pulse detected from the recording medium is phase-locked to any one phase of the polyphase reference signal, even when the phase of the servo pulse is jumped as in the splice-edition point, the running speed variation of the recording medium can be kept to a minium, and moreover, the block address of the data to be recorded newly can be generated so as to prevent a phase relation of the servo pulse to the block address of data from being changed before and after the splice-edition point. In this case, since the lock mode signal from the polyphase servo circuit is employed, the correct block address can be generated by a simple arrangement.

The polyphase servo circuit is not limited to four phases, it is enough that the reference phase signal has the frequency of an integral multiple of more than 2. Moreover, such a reference phase signal may be used which becomes a trapezoidal waveform or a triangular waveform when converted into an analog waveform.

Furthermore, this invention is not limited to magnetic tape, but can be applied to a case where a recording medium of disc shape is used with the same action and effect.

The above description is given on a single preferred embodiment of the invention, but it will be apparent that many modifications and variations could be effected by one skilled in the art without departing from the spirit or scope of the novel concepts of the invention, so that the scope of the invention should be determined by the appended claims only.

We claim as our invention:

1. Apparatus for recording and reproducing a digital signal, said digital signal being in the form of successive data blocks, each data block including at least plural data words and a block address circulating with a predetermined phase relation to a reference signal and recorded on a recording medium on which is recorded a control signal, said apparatus being characterized by:
   means for reproducing said data blocks including said data words and block addresses from said recording medium;
   time base correcting means for correcting a time base error contained in a reproduced data word fed thereto from said means for reproducing said data blocks;
   means for reproducing said control signal from said recording medium;
   means for generating a reference phase signal having a frequency that is an integral multiple of more than two times the frequency of said control signal;

sampling means for sampling said generated reference phase signal by said reproduced control signal so as to generate a phase compared output signal and a lock mode signal to determine block addresses; and servo means for controlling the transport speed of said recording medium in response to said phase compared output signal.

2. The apparatus of claim 1, wherein said means for generating said reference phase signal includes a counter to which is supplied a clock signal with a constant frequency and said sampling means is formed of a D-type flip-flop circuit.

3. The apparatus of claim 1 further comprising:
means for recording said data blocks, each including said data words and block addresses on said recording medium;
means for generating a block address for recording; and
address changing means for changing said block address for recording in response to said lock mode signal.

4. The apparatus of claim 3, wherein said means for generating said block address is formed of a counter to which is supplied a clock signal having a period equal to a period of said data block and said address changing means includes means for code-converting said lock mode signal and presetting said counter by a code-converted signal fed from said means for code converting.

5. The apparatus of claim 4, in which said means for code-converting comprises a two's-complement code convertor receiving said lock mode signal.

6. The apparatus of claim 1, further comprising time-delay means receiving said lock mode signals for imparting thereto a time delay equal in length to at least one data block.

7. Apparatus for editing digital signals onto a recording medium that is transported at a specified rate, each of said digital signals being formed of successive data blocks, each including a plurality of data words and respective block address having a cyclically recirculating phase relationship with a reference signal and in which a first of said digital signals and a control signal based on said reference signal are recorded on said recording medium, said apparatus comprising:
means for reproducing said control signal from said recording medium and producing a gating signal therefrom;
means receiving said gating signal for producing therefrom a recording medium transport rate control signal and a lock mode signal;
means for reproducing said data blocks of said first of said first digital signal including said plurality of data words and respective block addresses from said recording medium;
means receiving said lock mode signal, said reproduced data blocks, and a second digital signal to be edited into said first digital signal for producing an edit signal including data contained in said second signal and having a recording block address formed in response to said lock mode signal; and
means for recording said edit signal onto said record medium whereby said record medium is formed having selected portions of both of said first and second signals recorded thereon.

8. Apparatus according to claim 7, further comprising a motor control servo-loop receiving said recording medium transport rate control signal for controlling the rate of transport of said recording medium in response thereto.

9. Apparatus according to claim 7, further comprising time delay means receiving said lock mode signal and for imparting a time delay thereto equal in length to at least one data block, and said time delayed lock mode signal being fed to said means for producing an edit signal.

10. Apparatus according to claim 9, in which said means for producing an edit signal includes a block address generator receiving said time-delayed lock mode signal and producing a block address thereof; cross-fading means receiving said reproduced first digital signal and said second digital signal for producing a variable composite signal therefrom, and encoder means receiving said composite signal and said block address for producing an encoded edit signal fed to said means for recording.

11. Apparatus according to claim 10, in which block address generator means includes a counter receiving clock signal having a period equal in length to said data block and code converting means receiving said time-delayed lock mode signal and producing a code converted signal fed to preset said counter.

12. Apparatus according to claim 11, in which said code converting means comprises a two's-complement code convertor.

13. Apparatus according to claim 7, in which said means for producing said transport rate control signal and said lock mode signal includes counter means connected to receive a clock signal having a constant frequency and sampling means connected to an output of said counter means and to said gating signal, for gating an output of said counter means in response thereto.

14. Apparatus according to claim 13, in which said sampling means comprises a plurality of D-type flip-flop circuits having said gating signal connected to a trigger input.

15. Apparatus according to claim 14, in which said plurality of D-type flip-flop circuits are arranged to form a multi-bit digital word and said lock mode signal is formed of the upper two bits thereof.

* * * * *